US005183669A

United States Patent [19]
Guillemette

[11] Patent Number: 5,183,669
[45] Date of Patent: Feb. 2, 1993

[54] DEFLECTOR FOR CROSSHEAD EXTRUDER

[76] Inventor: A. Roger Guillemette, 10 Pike St., West Warwick, R.I. 02893

[21] Appl. No.: 705,947

[22] Filed: May 28, 1991

[51] Int. Cl.⁵ .......................... B05C 3/10; B29C 47/28
[52] U.S. Cl. .................................. 425/113; 118/404; 118/405; 118/420; 118/DIG. 18
[58] Field of Search ....... 118/404, 405, 420, DIG. 11, 118/DIG. 18; 425/113, 114, 130, 133.1

[56] References Cited
U.S. PATENT DOCUMENTS

| | | | |
|---|---|---|---|
| 3,833,325 | 9/1974 | Ramsey | 425/113 |
| 4,279,851 | 7/1981 | Lord et al. | 425/114 |
| 4,525,131 | 6/1985 | Hauser, Jr. | 425/114 |
| 4,657,718 | 8/1987 | Sicka et al. | 425/131.1 |
| 4,774,906 | 10/1988 | Lu | 425/113 |
| 4,832,588 | 5/1989 | Rasmussen | 425/114 |
| 4,838,777 | 6/1989 | Weber | 425/113 |
| 4,890,994 | 1/1990 | Shapler et al. | 425/131.1 |
| 4,892,699 | 1/1990 | Kudert et al. | 425/133.1 |
| 4,957,682 | 9/1990 | Kobayashi et al. | 425/130 |

Primary Examiner—W. Gary Jones
Assistant Examiner—Todd J. Burns
Attorney, Agent, or Firm—Salter, Michaelson & Benson

[57] ABSTRACT

Crosshead deflector for extrusion wire coating, including a wire guide tube carried in a holder, which holder is mounted in the main bore of a main body; a radial passage enters the main bore to introduce molten plastic and the holder is formed to bring about even flow around the guide tube for application to the wire as it moves out of the tube.

4 Claims, 2 Drawing Sheets

DEFLECTOR FOR CROSSHEAD EXTRUDER

BACKGROUND OF THE INVENTION

In the manufacture of plastic-coated Wire, it is common practice to run the wire through an orifice, while molten plastic flows through the orifice in the same direction and around the wire. The wire, which is now coated with molten plastic, may be passed through a bath which hardens the plastic, either by cooling it or subjecting it to a chemical hardening treatment. In any case, there is some difficulty in introducing molten plastic to the orifice, because of the fact that molten plastic is most effectively compounded and heated in a screw-type extruder and because the wire cannot practicably be passed through a bore in the extruder screw. Therefore, there has developed a class of devices called "crossheads" that receive the molten plastic from the extruder and cause it to flow at a right angle to the screw axis along the line of the wire movement and of the orifice axis.

Unfortunately, this process means that one must bring about the flow of plastic at a right angle to its original flow and do so in a device that performs other functions, such as guiding the wire carefully through the orifice. If, for instance, the molten plastic flows faster or at greater pressure through the orifice on one side of the wire, as compared with the other side, thickness of the coating will differ around the circumference. Attempts have been made to solve this problem by guiding the wire off-center of the orifice to compensate, but it can be seen that variations of temperature of the molten plastic from time-to-time will produce changes in viscosity and necessitate changing the geometry between the wire and the orifice surface. It is difficult, of course, for an operator to keep up with such changes and, furthermore, the coating thickness may "drift" away from specification before the change is discovered and corrected.

One solution to the difficulty has been to lock the wire in place within the orifice at the exact center and then to use various means to maintain the flow of molten plastic constant around the circumference by using flow-directing surfaces. One way that has been used to provide such surfaces involves providing a holder surrounding and supporting the wire-guiding tube with deflector surfaces. A fairly successful version of this practice involved forming the deflector surfaces as a curved radial cut that starts at a position on the holder adjacent the passage and curves in both directions around the holder while being directed longitudinally toward the exit of the tube. This guides the molten plastic that arrives from the passage toward the side of the holder opposite the passage. This has a tendency to encourage the plastic to move to that other side, so that the natural tendency of the plastic to flow immediately to the exit on the passage side is inhibited. Even with such a construction, the plastic coating can be applied evenly on all sides of the wire only by painstaking adjustments of the control elements of the crosshead, and there is a tendency to obtain weld lines where various flows of plastic come together on the wire. These and other difficulties experienced with the prior art devices have been obviated in a novel manner by the present invention.

It is, therefore, an outstanding object of the invention to provide a crosshead in which an even coating of molten plastic can be applied to the surface of a wire without constant adjustment of the elements.

Another object of this invention is the provision of a crosshead in which a wire coating is produced which minimizes weld lines produced by separated flows in the orifice.

A further object of the present invention is the provision of a crosshead whose interior flow surfaces are configured to give even plastic flow around the exit orifice without crossing of lines of flow.

A still further object of the invention is the provision of a crosshead deflector which is simple and rugged in construction, which can be readily manufactured, and which is capable of a long life of useful service with a minimum of maintenance.

It is a further object of the invention to provide a crosshead which can be used to give an even plastic coating on wire with little attention from the machine operator and which is easily disassembled, cleaned, and re-assembled with very little downtime.

Another object of the invention is the provision of a deflector which gives even plastic flow around the circumference of the deflector, so that the operator does not need to make adjustments in other elements, such as the tip and die.

With these and other objects in view, as will be apparent to those skilled in the art, the invention resides in the combination of parts set forth in the specification and covered by the claims appended hereto.

SUMMARY OF THE INVENTION

In general, the invention relates to a crosshead for the plastic coating of wire, the crosshead having a main body with a main bore extending therethrough and with a passage extending radially of the bore for the introduction into the bore of molten plastic from an extruder. A core tube is mounted coaxially of the main bore and has a central bore to guide the wire for movement coaxially of the bore. A core tube holder or deflector is provided, having an external cylindrical surface that fits snugly in the main bore adjacent the radial passage and having a bore to receive and support the core tube coaxially of the main bore. The core tube holder is provided with deflector surfaces in the vicinity of the said passage to cause the molten plastic arriving from the passage to flow around the core tube for deposit in an even layer on the wire.

More specifically, an end portion of the core tube holder extends axially from adjacent the passage to the vicinity of the exit end of the main bore and terminates in a frusto-conical bevel. The end portion is formed with a wide groove that initially faces the passage and extends around the end portion in both directions, while it progresses smoothly in a curve axially toward the bevel. This provides a smaller cross-sectional area for plastic flow between the end portion and the main bore surface in the direction of the passage than in the direction opposite it. One side of the groove is defined by an enlargement on the end portion, which enlargement extends toward the side of the bore on which the passage is located. The enlargement has an outer surface that is generally cylindrical and that extends coaxially and around the end portion and has a diameter of a size between that of the end portion and that of the main bore.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
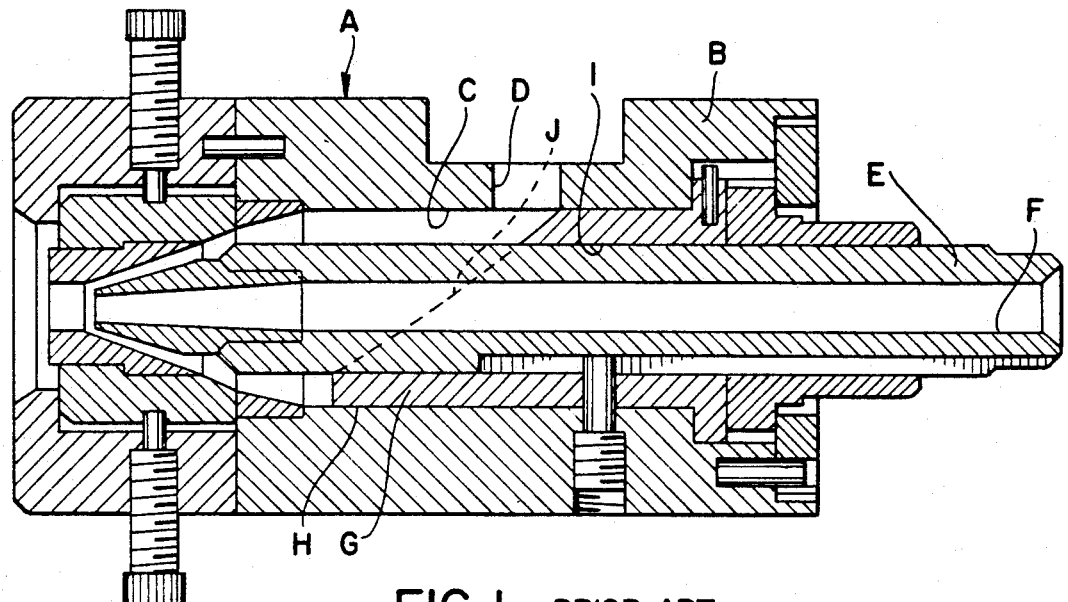
FIG. 1 is a vertical sectional view of a crosshead deflector forming the prior art.
Figure 2:
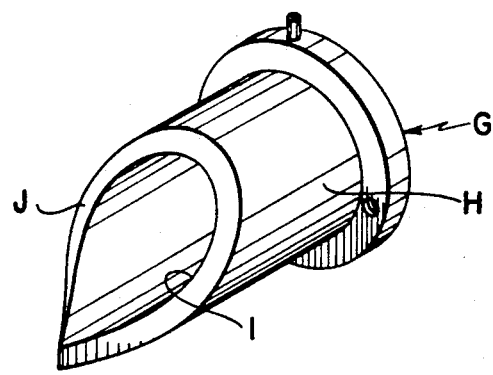
FIG. 2 is a perspective view of a core tube holder, forming part of the prior art crosshead.

FIGS. 1 and 2 show an example of a prior art crosshead for the plastic coating of wire. The crosshead A has a main body B with a main bore C extending therethrough and with a passage D extending radially of the bore for the introduction into the bore of molten plastic from an extruder (not shown). A core tube E is mounted coaxially of the main bore and has a central bore F to guide the wire for movement coaxially of the bore. A core tube holder G is provided, having an external cylindrical surface H that fits snugly in the main bore at a portion thereof removed from the passage D and having a bore I to receive and support the core tube coaxially of the main bore C. The core tube holder is provided with deflector surfaces J in the vicinity of the passage to cause the molten plastic arriving from the passage to flow around the core tube for deposit in an even layer on the wire which is supported by and is moving through the bore F in the core tube E.

Figure 3:
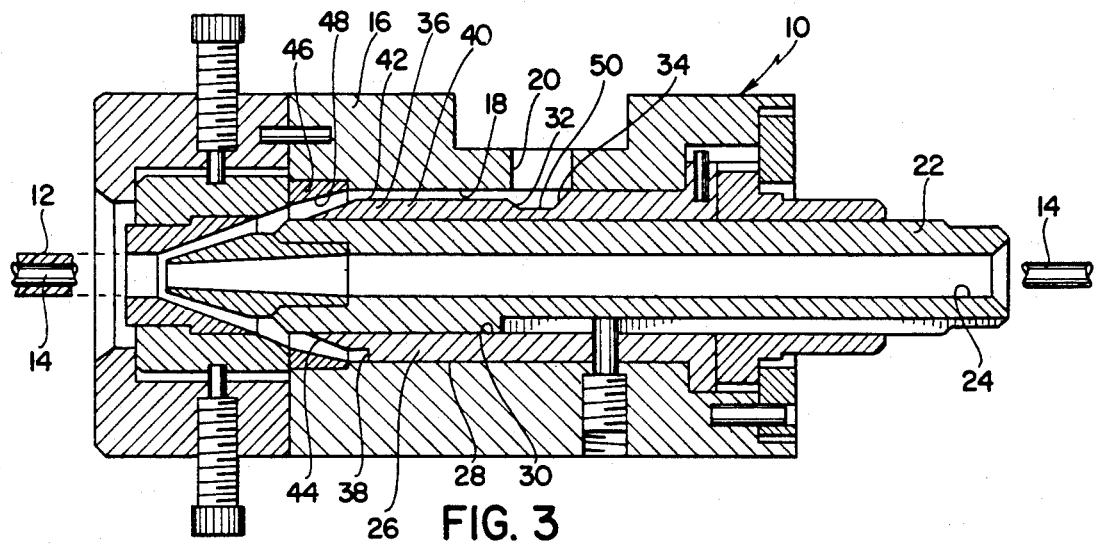
FIG. 3 is a vertical sectional view of a crosshead incorporating the principles of the present invention.
Figures 4, 5:
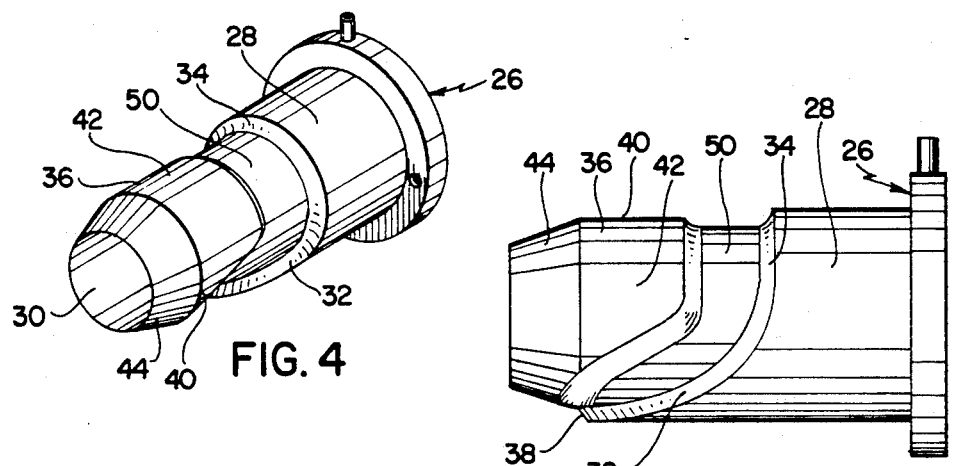
FIG. 4 is a perspective view of a core tube holder forming part of the invention.
FIGS. 5, 6, and 7 are side elevational, top plan, and bottom plan views, respectively, of the core tube holder.
Figures 6, 7:
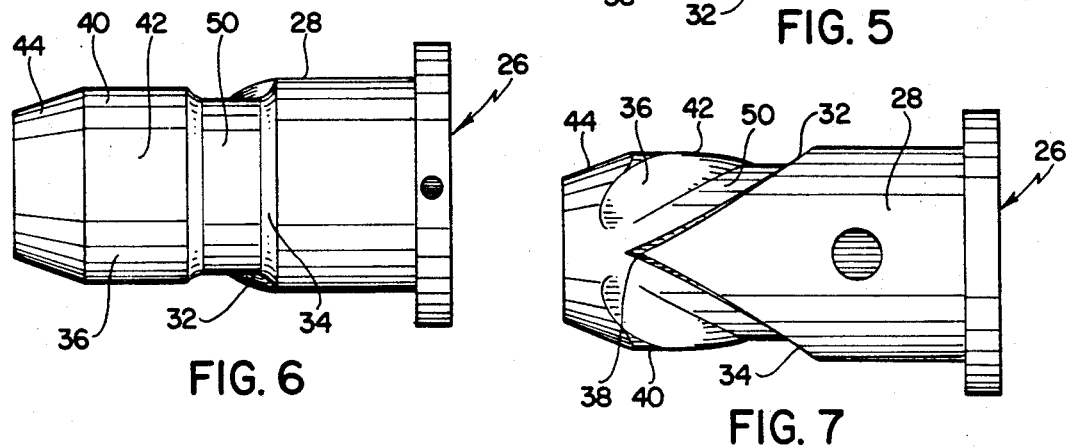

Referring next to FIG. 3, which best shows the general features of the present invention, the crosshead, indicated by the reference numeral 10, is shown while applying a coating 12 to a wire 14. The crosshead is provided with a main body 16 having a main bore 18 extending therethrough and having a passage 20 extending radially of the bore for the introduction into the bore of molten plastic from an extruder (not shown).

A core tube 22 is mounted coaxially of the main bore and has a central bore 24 to guide the wire for movement coaxially of the main bore 18. A core tube holder 26 is provided having an external cylindrical surface 28 that fits snugly in the main bore adjacent the passage 20. The holder has a bore 30 to receive and support the core tube 22 coaxially of the main bore 18. The core tube holder is also provided with deflector surfaces, indicated generally by the reference numeral 32, located in the vicinity of the passage 20 to cause the molten plastic arriving from the passage to flow around the core tube for deposit in an even layer on the wire.

FIGS. 4–7 show the details of the core tube holder or deflector 26 and, particularly, the specific form of the deflector surfaces 32. The external cylindrical surface 28 of the core tube holder terminates in a generally radial bevelled guide surface 34 leading to a generally cylindrical end portion 36 that is coextensive with the passage, the guide surface extending around the deflector and curving in a smooth curve away from the radial passage in a downstream direction to merge in point 38 exactly opposite to the side facing the passage 20. The end portion 36 is provided with an enlargement 40 that extends, in general, toward the side of the main bore 18 on which the passage 20 is located. The enlargement 40 has an outer surface 42 that is somewhat cylindrical and that extends coaxially and around the end portion 36 and has a diameter of a size between that of the rest of the end portion and that of the main bore so as to define an axial passage between the enlargement and the main bore. The enlargement extends around the end portion in opposite directions for about 90 degrees on each side of the part that faces in the direction of the passage before curving downstream. The extreme end of the core tube holder is provided with a frusto-conical bevel 44. In the preferred embodiment of the invention, a wedge ring 46 (see FIG. 3) is mounted coaxially of the main body and is provided with an internal frusto-conical surface 48 that lies generally coextensively with the bevel 44 on the holder and in spaced relation thereto to define a frusto-conical passage.

It can be seen, then, that the end portion 36 of the core tube holder 26 extends from adjacent the passage 20 to the vicinity of the exit end of the core tube and terminates in the frusto-conical bevel 44. The end portion is formed with a wide groove 50 which initially faces the passage 20 and extends around the end portion in both directions, while progressing smoothly in a curve axially toward the bevel. Thus, it provides a smaller cross-sectional flow area for plastic flow between the end portion and the main bore surface in the direction of the passage than in the direction opposite it. In the preferred embodiment, the groove 50 is flared at its ends adjacent the bevel.

The operation and the advantages of the invention will now be readily understood in view of the above description. To begin with, the plastic is prepared in the extruder in the usual way, with the heating and the mixing of ingredients taking place in that apparatus. The plastic that has been prepared is introduced (under the pressure of the extruder screw) to the exterior of the crosshead deflector 10 and flows through the passage 20 into the main bore 18. Since the external surface 28 of the core tube holder 26 fits tightly in the main bore, the molten plastic can only flow to the left (in FIG. 3) of the guide surface 34. This means, of course, that the amounts and directions of plastic flow are dictated by the deflector surfaces 32 of the holder, which surfaces are designated in general to be any of the surfaces located on the holder to take part in the regulation of the flow. The guide surface 34 forces some of the plastic to flow around the end portion 36, while also causing it to flow axially toward the point 38 where the two parts of the guide surface come together at the side of the end portion that faces away from the passage 20. At the same time, some of the plastic flows along the side of the end portion that faces the passage and this flow would be rather large, because of the shorter path and lesser friction, if it were not for the enlargement 40. This enlargement presents the broad cylindrical surface 42 toward the portion of the surface of the main bore 18 that is located directly downstream of the entrance passage 20. The enlargement wraps around the end portion for approximately 90 degrees on each side and provides for a definite restriction in cross-sectional area for flow in that vicinity. At the same time that the flow is being restricted along the surfaces facing the passage, the shaped elements on the other side, which define a large groove 50 provide for easier flow, particularly because of a flaring at the end of the groove nearest the exit of the core tube 22. By the time the plastic flow reaches the annular orifice between the bevel 44 (on the holder) and the frusto-conical surface 48 (on the wedge ring 46), the flow is very even all around the end portion of the holder. This means that the coating 12 applied to the wire 14 can be maintained in accordance with specification requirements.

It can be seen, then, that the use of the present invention will permit the machine operator to maintain the coating thickness within tolerance limits without continually adjusting the gaps at the tip and die. The even application is maintained, despite variations that may occur in plastic temperature, which changes would result in viscosity changes. The shape of the end portion that brings about this satisfactory operation is such that the holder is easily cleaned and otherwise maintained. The likelihood of damage to this important element is minimal and it is easily replaced by a substitute (or removed and replaced) with little down time.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

What is claimed is:

1. A deflector for a crosshead;

said crosshead including a body having a main bore extending therethrough, a radial passage extending into a first side of said bore for the introduction of a stream of molten plastic, and a core tube mounted coaxially therein, said core tube having a central bore, said deflector comprising a cylindrical surface that fits snugly in the main bore adjacent said radial passage, a recessed deflector surface in communication with said radial passage, and a bore for receiving and supporting the core tube coaxially of the main bore, said cylindrical surface terminating in a generally radial bevelled guide surface which originates adjacent the upstream end of said radial passage and leads to said recessed deflector surface, said guide surface extending around said deflector and curving in a smooth curve away from said radial passage only in a downstream direction so as to merge at a point opposite said first side, said deflector including an enlargement which extends coaxially around a portion of the deflector adjacent the downstream end thereof and extends around said deflector in opposite directions for about 90° at said first side before curving downstream, said enlargement having a cylindrical outer surface of a diameter greater than that of the recessed deflector surface and less than that of the main bore so as to define an axial passage between said cylindrical outer surface and said main bore whereby molten plastic entering through said radial passage simultaneously flows along said recessed deflector surface and through said axial passage, said deflector further including a frusto-conical bevel at the downstream end thereof.

2. In the deflector of claim 1, said crosshead including an internal frusto-conical surface that extends generally co-extensive with said frusto-conical bevel, and in spaced relation thereto to define a frusto-conical passage.

3. In the deflector of claim 1, said crosshead including a coaxial wedge ring adjacent the exit end thereof, said wedge ring including an internal frusto-conical surface that extends generally coextensive with said frusto-conical bevel, and in spaced relation thereto to define a frusto-conical passage.

4. A deflector for a crosshead, said deflector having upstream and downstream ends and first and second sides and comprising;

a cylindrical surface adjacent said upstream end, a recessed deflector surface adjacent said cylindrical surface, an enlargement adjacent said downstream end, a frusto-conical bevel at the downstream end thereof, and a bore extending therethrough, said cylindrical surface terminating in a generally radial bevelled guide surface which leads to said recessed deflector surface, said guide surface originating at said first side, extending around said deflector and curving in a smooth curve away from said first side only in a downstream direction so as to merge at a point on said second side, said enlargement extending coaxially around said deflector in opposite directions for about 90° at said first side before curving downstream, and having a cylindrical outer surface of a diameter greater than that of the recessed deflector surface and less than that of the cylindrical surface.

* * * * *